(12) United States Patent
Griess et al.

(10) Patent No.: US 9,630,376 B2
(45) Date of Patent: Apr. 25, 2017

(54) COMPOSITE FILLER

(71) Applicant: The Boeing Company, Chicago, IL (US)

(72) Inventors: Kenneth H. Griess, Kent, WA (US); Jack J. Esposito, Auburn, WA (US)

(73) Assignee: THE BOEING COMPANY, Chicago, IL (US)

(*) Notice: Subject to any disclaimer, the term of this patent is extended or adjusted under 35 U.S.C. 154(b) by 80 days.

(21) Appl. No.: 14/492,720

(22) Filed: Sep. 22, 2014

(65) Prior Publication Data

US 2016/0082694 A1 Mar. 24, 2016

(51) Int. Cl.
| | |
|---|---|
| *B32B 38/04* | (2006.01) |
| *B32B 5/26* | (2006.01) |
| *B26F 1/02* | (2006.01) |
| *B29C 67/00* | (2017.01) |
| *B29C 70/30* | (2006.01) |
| *B29L 31/30* | (2006.01) |
| *B29L 31/00* | (2006.01) |

(52) U.S. Cl.
CPC .................. *B32B 5/26* (2013.01); *B26F 1/02* (2013.01); *B29C 67/0074* (2013.01); *B29C 70/30* (2013.01); *B29C 2793/0072* (2013.01); *B29L 2031/001* (2013.01); *B29L 2031/3076* (2013.01); *B32B 2038/042* (2013.01); *Y10T 156/1075* (2015.01)

(58) Field of Classification Search
CPC ......... Y10T 156/1075; Y10T 156/1761; B32B 2038/042
USPC ..................... 428/298.1, 300.7; 156/264, 250
See application file for complete search history.

(56) References Cited

U.S. PATENT DOCUMENTS

| | | | | |
|---|---|---|---|---|
| 4,666,546 | A * | 5/1987 | Treber .................. | B29C 70/228 156/264 |
| 4,789,594 | A * | 12/1988 | Stawski .................. | B26D 1/02 156/222 |
| 5,649,349 | A | 7/1997 | Greenway | |
| 6,183,583 | B1 * | 2/2001 | Duval ..................... | C04B 35/83 156/148 |
| 2006/0249868 | A1 * | 11/2006 | Brown .................. | B29C 70/342 264/163 |
| 2013/0105072 | A1 * | 5/2013 | Anderson ............. | B29C 70/526 156/264 |
| 2013/0167696 | A1 | 7/2013 | Ueno et al. | |

* cited by examiner

*Primary Examiner* — Scott W Dodds
(74) *Attorney, Agent, or Firm* — Yee & Associates, P.C.

(57) ABSTRACT

A method and apparatus for forming a composite filler is presented. The method comprises cutting a number of layers from a composite material. The method also aligns the number of layers to form a composite filler having a cross-sectional shape. Each of the number of layers has fibers in plane with the cross-sectional shape.

15 Claims, 15 Drawing Sheets

COMPOSITE FILLER

BACKGROUND INFORMATION

1. Field

The present disclosure generally relates to composite structures and, in particular, to the fabrication of composite structures. Still more particularly, the present disclosure relates to a method and apparatus for producing composite fillers used to fill gaps in composite structures.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, lightweight materials created by combining two or more functional components. For example, a composite material may include reinforcing fibers bound in a polymer resin matrix. The fibers may be unidirectional or may take the form of a woven cloth or fabric. In thermoset composites, fibers and resins are arranged and cured to form a composite material.

When composite structural members are joined together, gaps or voids may be present along bond lines between the members which may need to be filled in order to increase the strength of the bond. For example, in the aircraft industry, composite fuselage stiffeners such as stringers may include a composite filler at the radius bond line between the stringer and a fuselage skin. The composite filler is applied in the form of triangular cross-section strips, sometimes referred to as noodles or fillers, which fill the voids at the bond line. The composite filler may be formed from composite materials such as adhesive or prepreg tape.

These fillers may be prone to cracking. Cracking undesirably reduces the performance of the resulting composite structure. Cracking may be influenced by the material properties of at least one of the composite filler or the composite structural members.

Therefore, it would be desirable to have a method and apparatus that take into account at least some of the issues discussed above, as well as other possible issues. Specifically, one issue is to find a method and apparatus for preventing cracking in composite fillers.

SUMMARY

An illustrative embodiment of the present disclosure provides a method. The method comprises cutting a number of layers from a composite material. The method also aligns the number of layers to form a composite filler having a cross-sectional shape. Each of the number of layers has fibers in plane with the cross-sectional shape.

Another illustrative embodiment of the present disclosure provides a composite filler. The composite filler comprises a cross-sectional shape and a number of layers of composite material. Each of the number of layers of the composite material has fibers in plane with the cross-sectional shape.

Yet another illustrative embodiment of the present disclosure provides a method. The method comprises cutting a number of layers from a fabric. The method also resin infuses the number of layers to form a number of layers of composite material. The method further aligns the number of layers of composite material to form a composite filler having a cross-sectional shape. Each of the number of layers has fibers in plane with the cross-sectional shape.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that cracking of a composite filler may result from tensile forces within a filler. These tensile forces may be caused by a differential coefficient of thermal expansion between the different directions within the composite material. Specifically, shrinkage of the composite material may be different along the direction of the fibers in the composite material. The tensile forces may effectively "pull" the filler apart.

The illustrative examples further recognize and take into account that fibers in composite materials do not substantially expand or contract during heating and cooling. Therefore, the illustrative examples recognize and take into account that composite materials do not substantially expand and contract in directions in which the fibers of the composite materials run.

The illustrative examples further recognize and take into account that reducing cracking in composite fillers may improve structural performance. The illustrative examples also recognize and take into account that reducing cracking in composite fillers may reduce cost by reducing instances of rework or replacement of cracked composite fillers.

Figure 1:
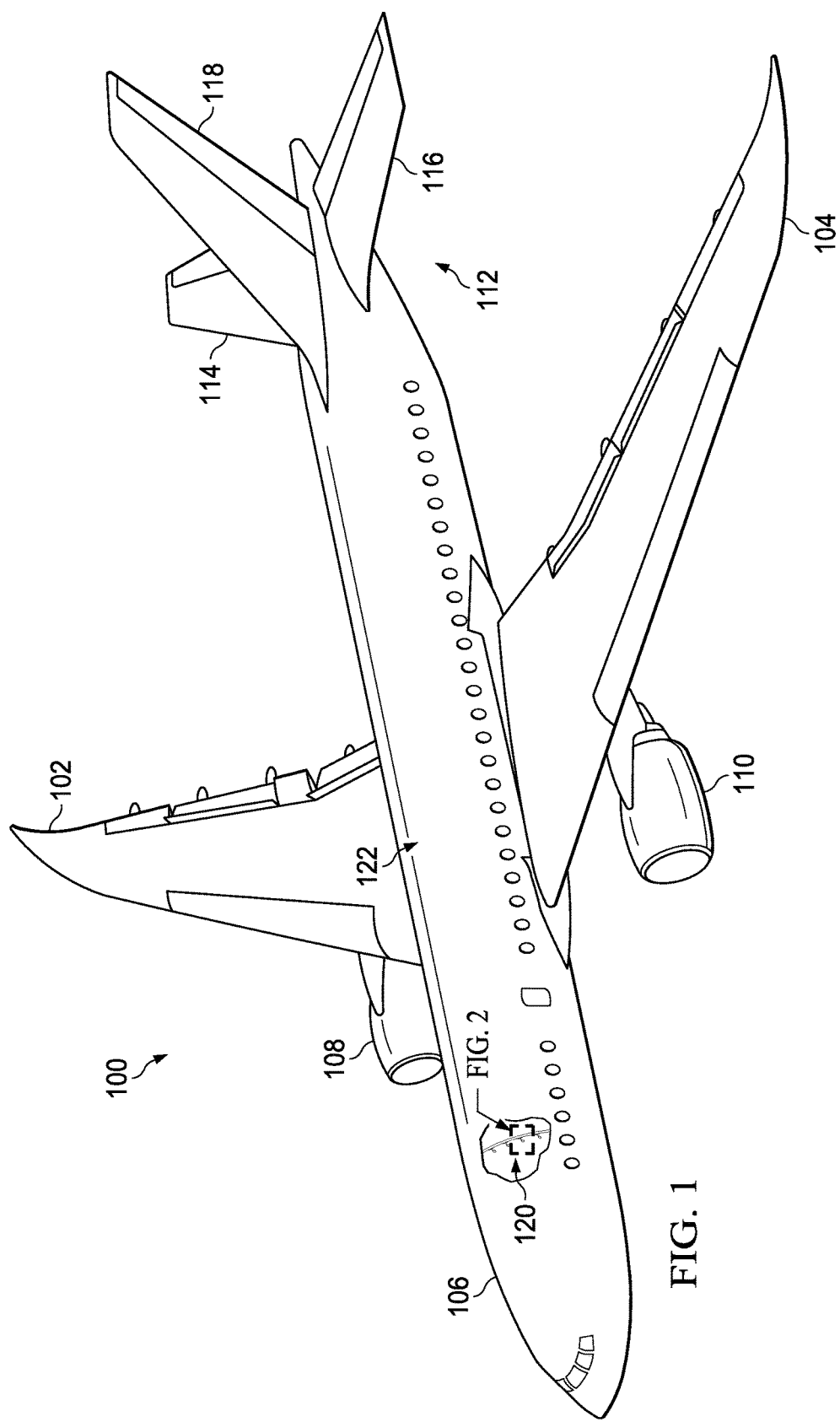
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a composite filler may be implemented in accordance with an illustrative embodiment. For example, composite fillers may be placed between stiffeners 120 and composite skin 122 of aircraft 100. FIG. 1 depicts an exposed view of stiffeners 120.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft.

Figure 2:
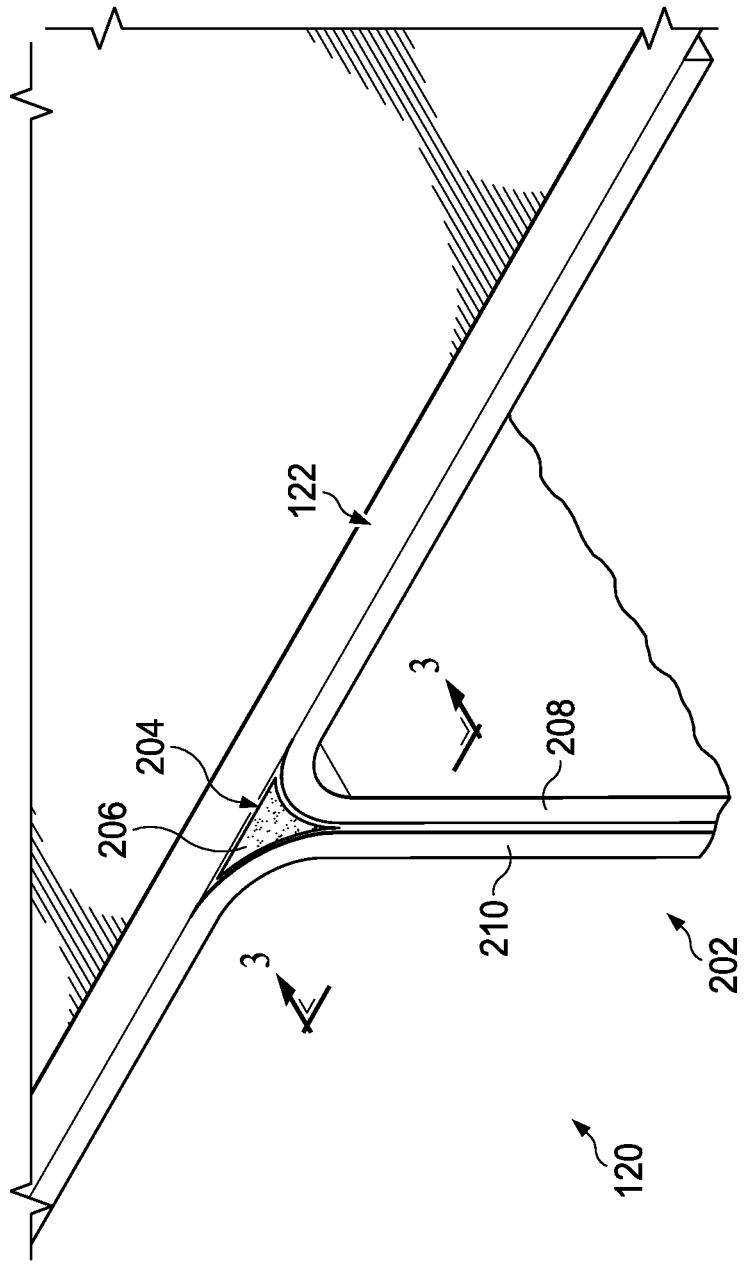
FIG. 2 is an illustration of an isometric view of a composite filler and a number of composite members in accordance with an illustrative embodiment.

Turning now to FIG. 2, an illustration of an isometric view of a composite filler and a number of composite members is depicted in accordance with an illustrative embodiment. Specifically, FIG. 2 is an enlarged view of stiffener 202 of stiffeners 120 in section 2-2 of FIG. 1. As depicted, composite filler 204 is placed in gap 206 formed by stiffener 202 and composite skin 122. In this illustrative example, composite filler 204 has a substantially triangular cross-section. Composite skin 122 is a composite member. Stiffener 202 is also a composite member. As depicted, stiffener 202 is formed by two composite members, composite member 208 and composite member 210. In some illustrative examples, stiffener 202 may instead be more or less than two composite members. In some illustrative examples, stiffener 202 is a composite stringer. In these illustrative examples, the composite stringer may be formed of a single composite member.

Figure 3:
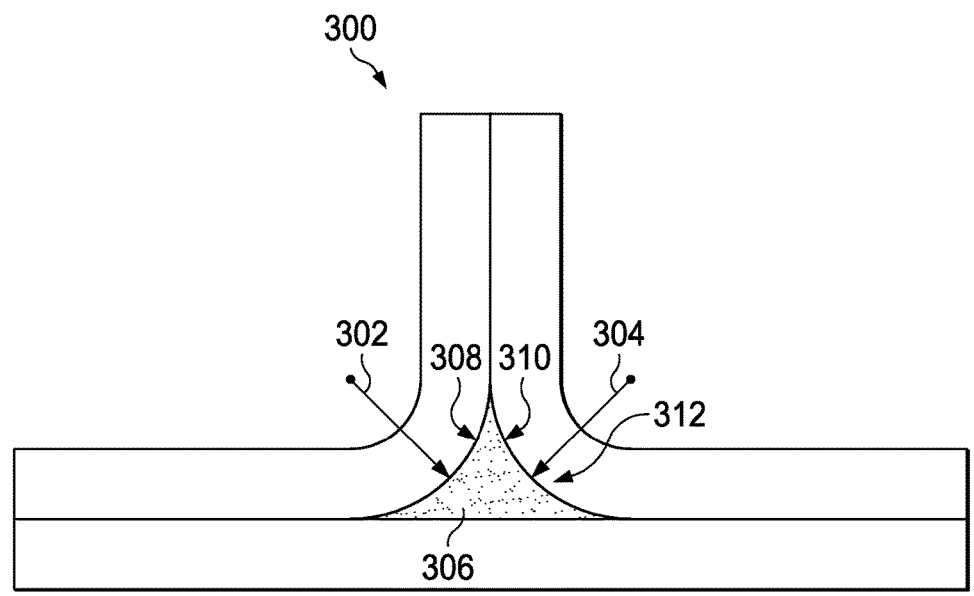
FIG. 3 is an illustration of a front view of a composite filler and a number of composite members in accordance with an illustrative embodiment.

Turning now to FIG. 3, an illustration of a front view of a composite filler and a number of composite members is depicted in accordance with an illustrative embodiment. Specifically, FIG. 3 may be a view of stiffener 202, composite filler 204, and composite skin 122 prior to curing from direction 3-3 of FIG. 2.

Composite member 300 has radius 302 and radius 304. Composite member 300 may be an example of stiffener 202 of FIG. 2 as a single composite member. Composite filler 306 is placed in gap 307 formed by composite member 300 and composite member 309. Composite filler 306 has first side 308 and second side 310. First side 308 of composite filler 306 follows radius 302. Second side 310 of composite filler 306 follows radius 304.

Composite filler 306 may be an example of composite filler 204 in FIG. 2. Composite filler 306 has cross-sectional shape 312. Composite filler 306 is formed of a number of layers of a composite material. Composite filler 306 and each of the number of layers have the same cross-sectional shape, cross-sectional shape 312. In this illustrative example, cross-sectional shape 312 is substantially triangular. Each of the number of layers has fibers in plane with cross-sectional shape 312. Further, each layer of the number of layers may be in plane with cross-sectional shape 312. As used herein, "a number of," when used with reference to items means one or more items. Accordingly, the number of layers may include one or more layers of composite material.

The number of composite layers may have one or more ply orientations. Specifically, the number of composite layers may have at least one of 0 degree plies, +/−10 degree plies, +/−15 degree plies, +/−30 degree plies, +/−45 degree plies, +/−60 degree plies, +/−75 degree plies, or +/−90 degree plies.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

In some illustrative examples, each layer of composite filler 306 may be formed of a composite laminate stack. In some illustrative examples, each layer of composite filler 306 may include multiple plies. In some illustrative examples, each layer of composite filler 306 may include a stack of 0 degree/60 degree/−60 degree plies.

Composite filler 306 has a longitudinal axis that extends into and out of the page. The fibers in the layers of composite filler that are in plane with cross-sectional shape 312 extend orthogonal to the longitudinal axis. As used herein, a first item is orthogonal to a second item when the first item is at a ninety degree angle to the second item. Orthogonal may also be referred to as perpendicular. Composite filler 306 may have a coefficient of thermal expansion of substantially zero orthogonal to the longitudinal axis. The coefficient of thermal expansion may be zero orthogonal to the longitudinal axis because of the fibers extending orthogonal to the longitudinal axis. Composite filler 306 may have a coefficient of thermal expansion of substantially zero orthogonal to each of the sides of cross-sectional shape 312. In some illustrative examples, when cross-sectional shape 312 is substantially triangular, having zero degree plies, 60 degree plies, and −60 degree plies may cause the coefficient of thermal expansion of substantially zero orthogonal to each of the three sides.

The illustration of composite filler 306 in FIG. 3 is not meant to imply physical or architectural limitations to the manner in which an illustrative embodiment may be implemented. Other components in addition to or in place of the ones illustrated may be used. Some components may be unnecessary. For example, composite filler 306 may have a cross-section that is not substantially triangular.

Figure 4:
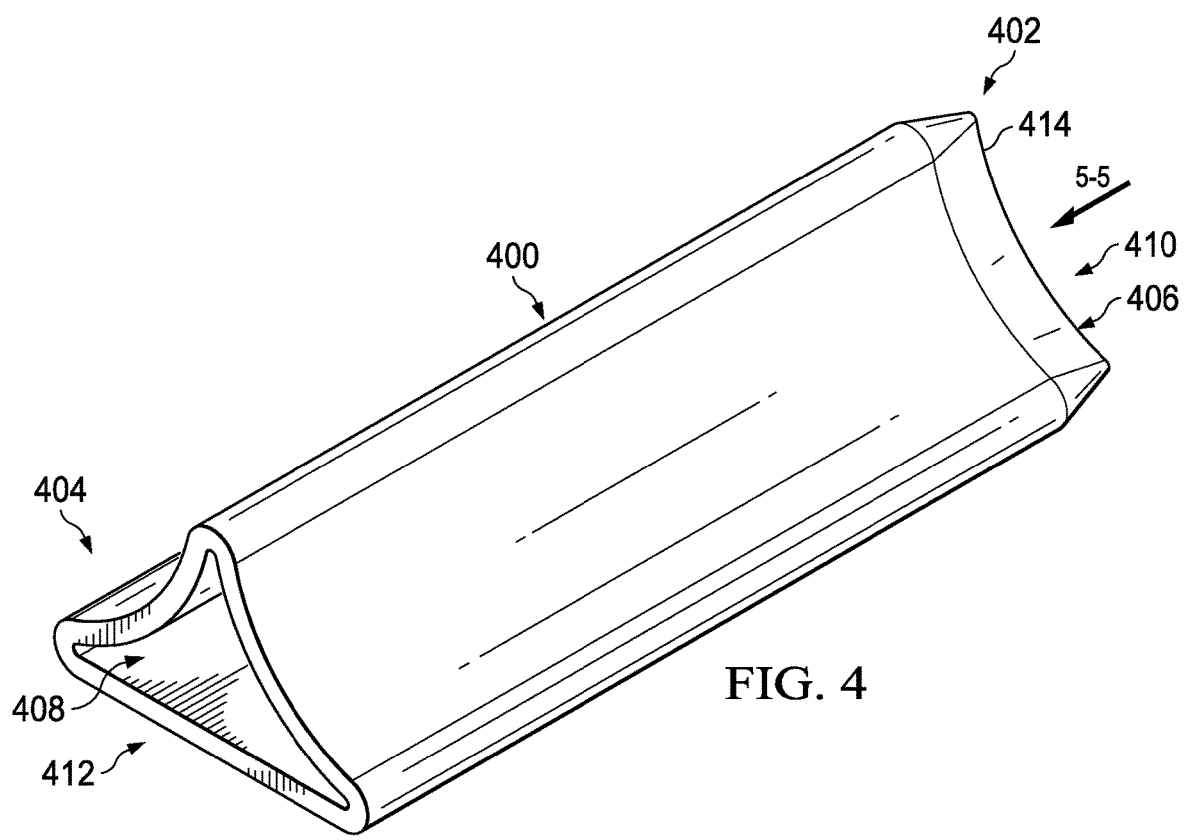
FIG. 4 is an illustration of an isometric view of a hollow punch in accordance with an illustrative embodiment.

Turning now to FIG. 4, an illustration of an isometric view of a hollow punch is depicted in accordance with an illustrative embodiment. Hollow punch 400 may be used to cut layers of composite material that may be aligned to form composite filler 306 of FIG. 3. Hollow punch 400 may be a physical embodiment of hollow punch 1550 of FIG. 15.

Hollow punch 400 has first end 402 and second end 404. First end 402 has opening 406. Second end 404 has opening 408. Cross-sectional area 410 of hollow punch 400 at first end 402 is smaller than cross-sectional area 412 of hollow punch 400 at second end 404. First end 402 has sharp edge 414.

Sharp edge 414 of hollow punch 400 may be pressed against a composite material to cut the composite material. The cut composite material may travel through hollow punch 400 from first end 402 to second end 404. The cut composite material may travel through hollow punch 400 as subsequent layers of composite material are cut by sharp edge 414 and travel from first end 402 towards second end 404.

Hollow punch 400 may be used in conjunction with other components for forming a composite filler. For example, hollow punch 400 may be used with a base. In some illustrative examples, hollow punch 400 may be used with a sleeve. In further illustrative examples, hollow punch 400 may be used with a heater. In yet further illustrative examples, hollow punch 400 may be used with resin injectors.

Figure 5:
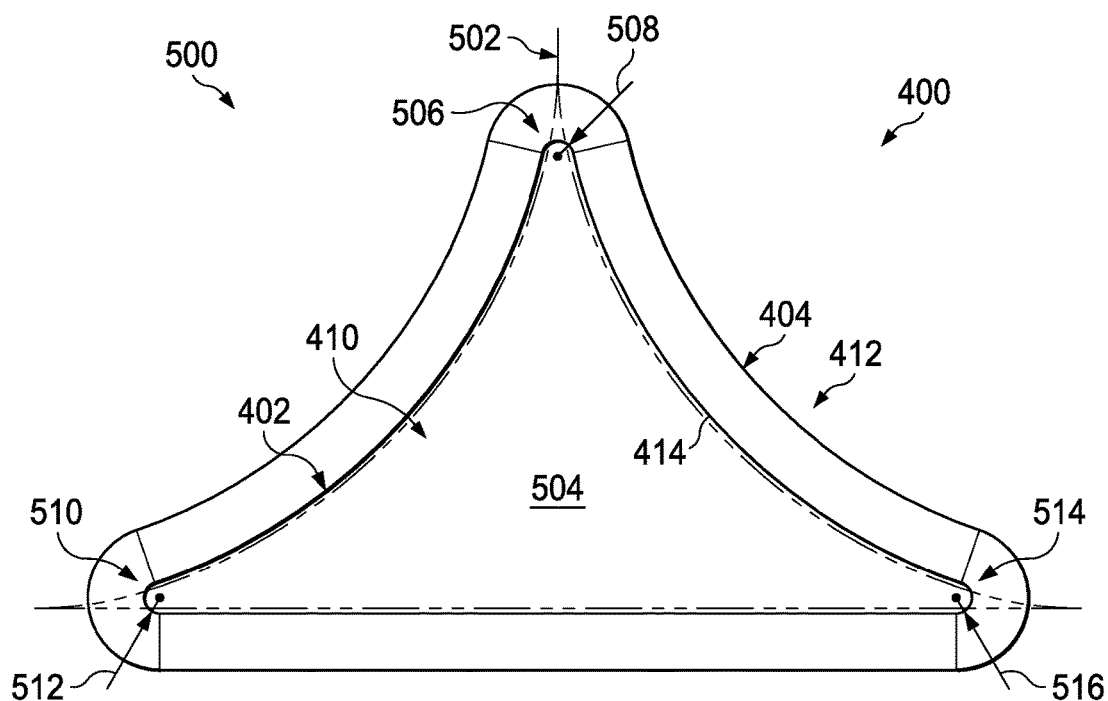
FIG. 5 is an illustration of a front view of a hollow punch in accordance with an illustrative embodiment.

Turning now to FIG. 5, an illustration of a front view of a hollow punch is depicted in accordance with an illustrative embodiment. View 500 may be a view of hollow punch 400 from direction 5-5 of FIG. 4.

Cross-sectional shape 502 is super-imposed over hollow punch 400. Cross-sectional shape 502 is a desired cross-sectional shape for a resulting composite filler. In some illustrative examples, cross-sectional shape 502 may be the same as cross-sectional shape 312 of FIG. 3.

As can be seen from view 500, some additional forming steps may be done to form a resulting composite filler into cross-sectional shape 502 from cross-sectional shape 504 of sharp edge 414. As can be seen clearly in view 500, cross-sectional area 410 of first end 402 is smaller than cross-sectional area 412 of second end 404.

Cross-sectional shape 502 and sharp edge 414 are substantially triangular. Sharp edge 414 has rounded corner 506 with radius 508, rounded corner 510 with radius 512, and rounded corner 514 with radius 516.

Figure 6:
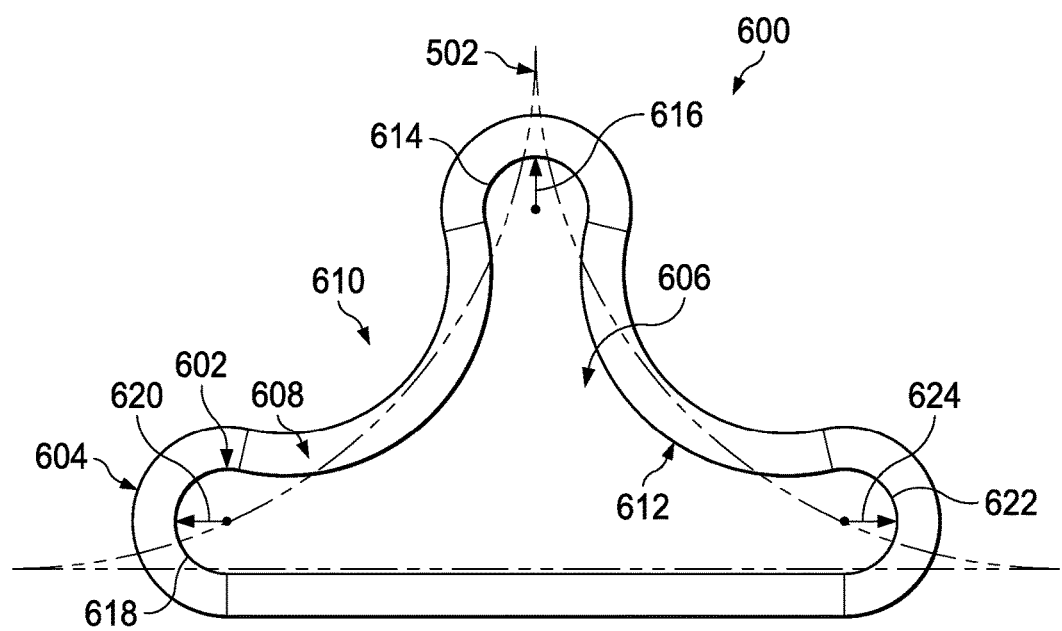
FIG. 6 is an illustration of a front view of another hollow punch in accordance with an illustrative embodiment.

Turning now to FIG. 6, an illustration of a front view of another hollow punch is depicted in accordance with an illustrative embodiment. Hollow punch 600 may be used to cut layers of composite material that may be aligned to form composite filler 306 of FIG. 3. Hollow punch 600 may be a physical embodiment of hollow punch 1550 of FIG. 15.

Hollow punch 600 has first end 602 and second end 604. First end 602 has opening 606. Second end 604 also has an opening, not shown in this view. Cross-sectional area 608 of hollow punch 600 at first end 602 is smaller than cross-sectional area 610 of hollow punch 600 at second end 604. First end 602 has sharp edge 612.

Sharp edge 612 of hollow punch 600 may be pressed against a composite material to cut the composite material. The cut composite material may travel through hollow punch 600 from first end 602 to second end 604. The cut composite material may travel through hollow punch 600 as subsequent layers of composite material are cut by sharp edge 612 and travel from first end 602 towards second end 604.

As depicted, cross-sectional shape 502 of FIG. 5 is super-imposed over hollow punch 600. Cross-sectional shape 502 and sharp edge 612 are substantially triangular. Sharp edge 612 has rounded corner 614 with radius 616, rounded corner 618 with radius 620, and rounded corner 622 with radius 624. As can be seen from FIG. 6, radius 616, radius 620, and radius 624 are substantially the same. Further, radius 616, radius 620, and radius 624 are substantially larger than radius 508, radius 512, and radius 516 of FIG. 5. As a result, a composite filler formed using hollow punch 600 may require a greater amount of forming to reach cross-sectional shape 502 than a composite filler formed by hollow punch 400.

Figure 7:
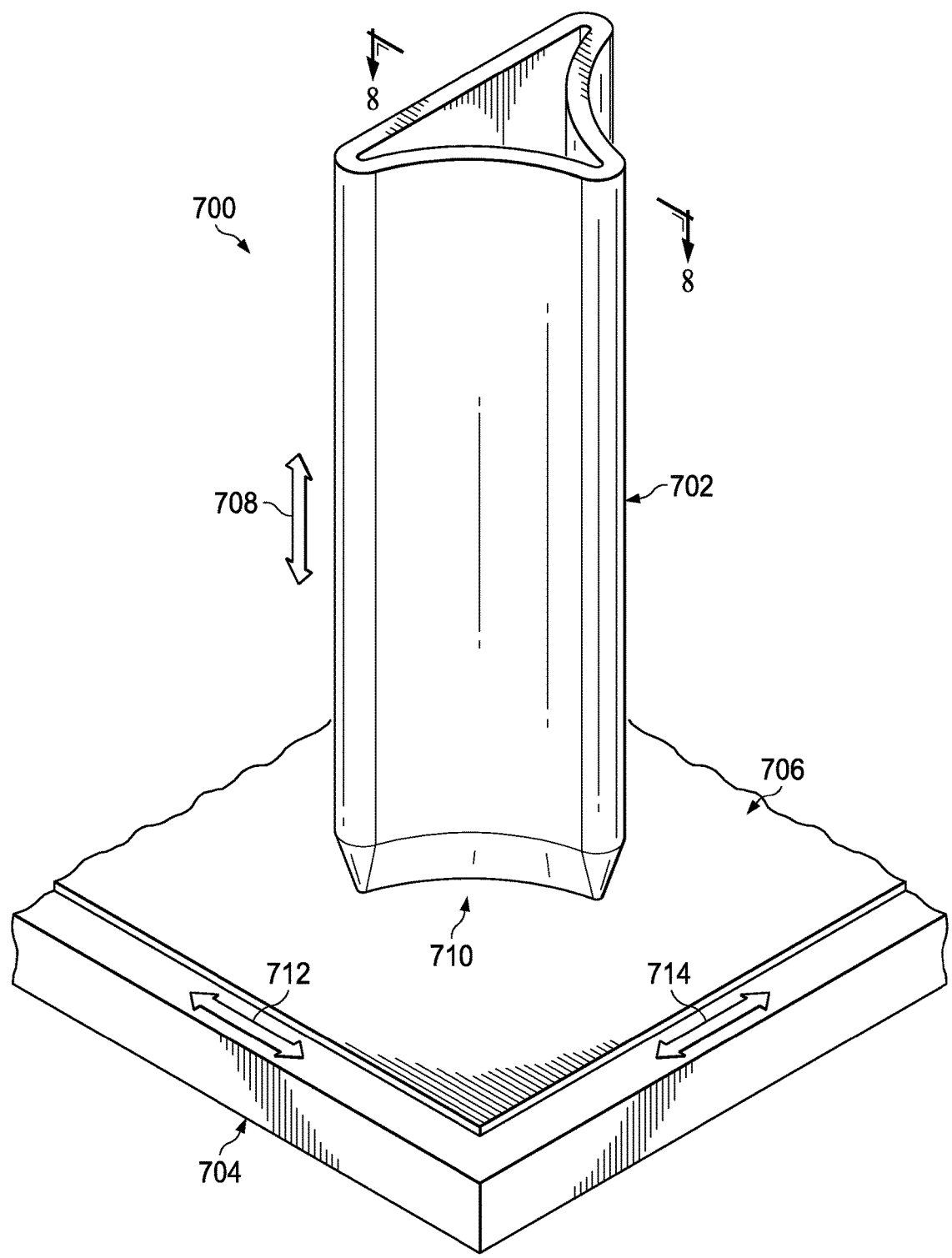
FIG. 7 is an illustration of an isometric view of composite filler forming equipment in accordance with an illustrative embodiment.

Turning now to FIG. 7, an illustration of an isometric view of composite filler forming equipment is depicted in accordance with an illustrative embodiment. Composite filler forming equipment 700 includes hollow punch 702 and base 704. Hollow punch 702 may be hollow punch 400 of FIG. 4. Material 706 may be positioned between hollow punch 702 and base 704. In some illustrative examples, material 706 may be a composite material. In other illustrative examples, material 706 may be a fabric. Base 704 may be formed of at least one of a rigid material and a compliant material. In some illustrative examples, material for base 704 may be selected so that material 706 may be cut with clean edges. In some illustrative examples, material for base 704 may be selected such that a sharp edge of hollow punch 702 remains sharp for a desirable number of cuts.

Hollow punch 702 may be moved in direction 708 to cut material 706. Hollow punch 702 may cut material 706 by applying pressure to material 706 in direction 708 such that sharp edge 710 of hollow punch 702 cuts through material 706 to contact base 704. Hollow punch 702 may then be retracted in direction 708. When hollow punch 702 is retracted, a cut portion of material 706 may remain in hollow punch 702.

One of composite material 706 and base 704 or hollow punch 702 may move in at least one of direction 712 and direction 714 such that hollow punch 702 is positioned over composite material 706 that can be cut. Afterwards, hollow punch 702 may again be moved in direction 708 to cut material 706 again. This process may be repeated a desired number of times until a composite filler of desired length is formed.

Figure 8:
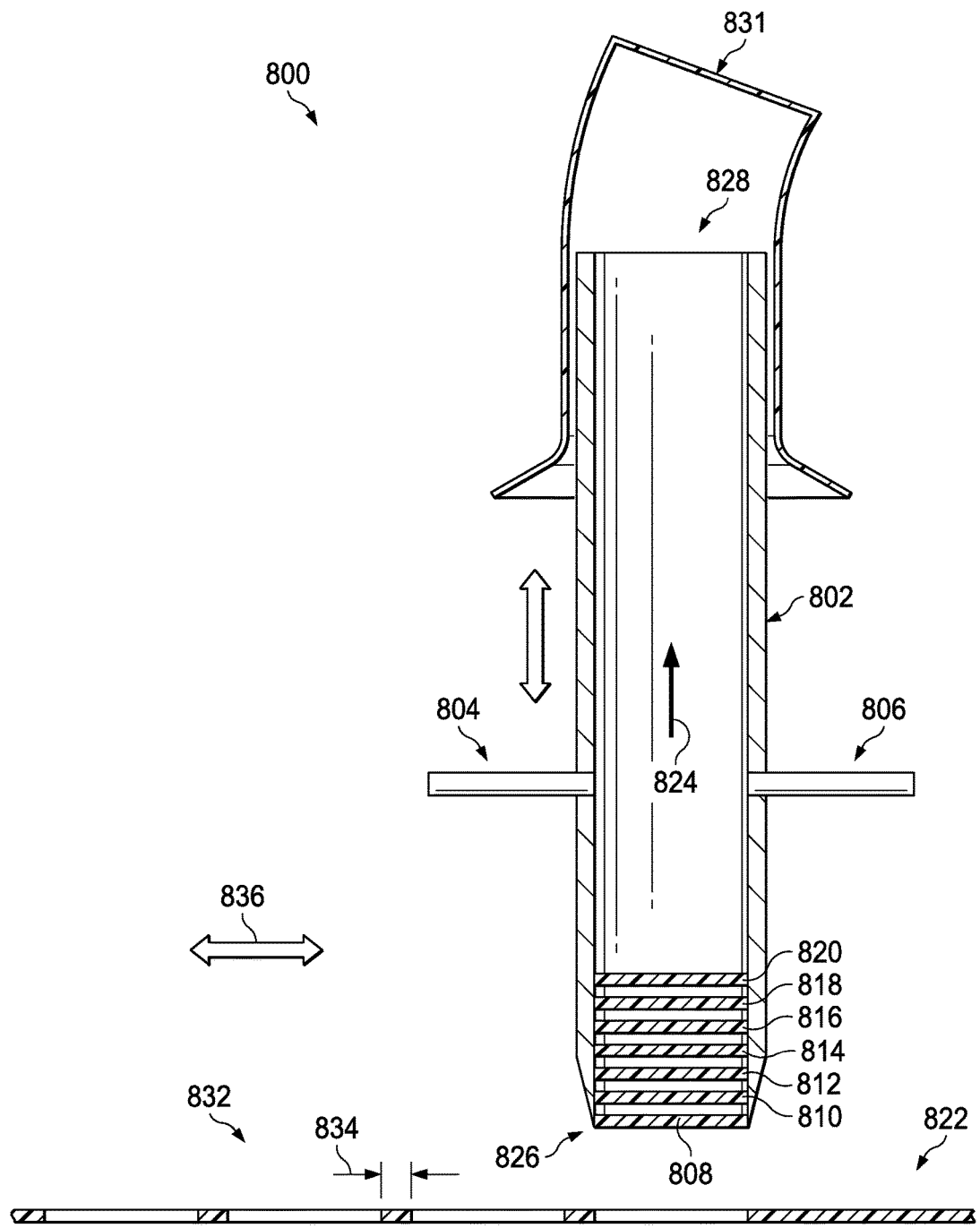
FIG. 8 is an illustration of a cross-sectional view of composite filler forming equipment in accordance with an illustrative embodiment.

Turning now to FIG. 8, an illustration of a cross-sectional view of composite filler forming equipment is depicted in accordance with an illustrative embodiment. View 800 may be a cross-sectional view of a hollow punch, such as hollow punch 702, along cut 8-8 of FIG. 7. In this illustrative example, hollow punch 802 has resin injector 804 and resin injector 806. Layer 808, layer 810, layer 812, layer 814, layer 816, layer 818, and layer 820 of material 822 traveling within hollow punch 802 in direction 824 from sharp edge 826 to end 828. As layer 808, layer 810, layer 812, layer 814, layer 816, layer 818, and layer 820 of material 822 travel in direction 824, they will eventually encounter sleeve 831. Sleeve 831 will collect layers of material 822 as they exit end 828 of hollow punch 802. Sleeve 831 may allow for better handleability of a resulting composite filler. The resulting composite filler would include sleeve 831 and a number of layers such as layer 808, layer 810, layer 812, layer 814, layer 816, layer 818, and layer 820 of material 822.

Material 822 has number of holes 832 from which layer 808, layer 810, layer 812, and layer 814 were cut. Portion 834 is positioned between two of number of holes 832. Portion 834 is related to a distance traveled by hollow punch 802 in direction 836 between each cut. Specifically, if the distance is increased, portion 834 will increase in width. If the distance is decreased, portion 834 will decrease in width. It is desirable for hollow punch 802 to travel a distance sufficient so that hollow punch 802 cuts a portion of material 822 the same shape as the cross-sectional shape of sharp edge 826. In other words, it is desirable for hollow punch 802 to move sufficiently so that all of sharp edge 826 contacts material 822 so that there is not a hole in the subsequent cut layer.

Figure 9:
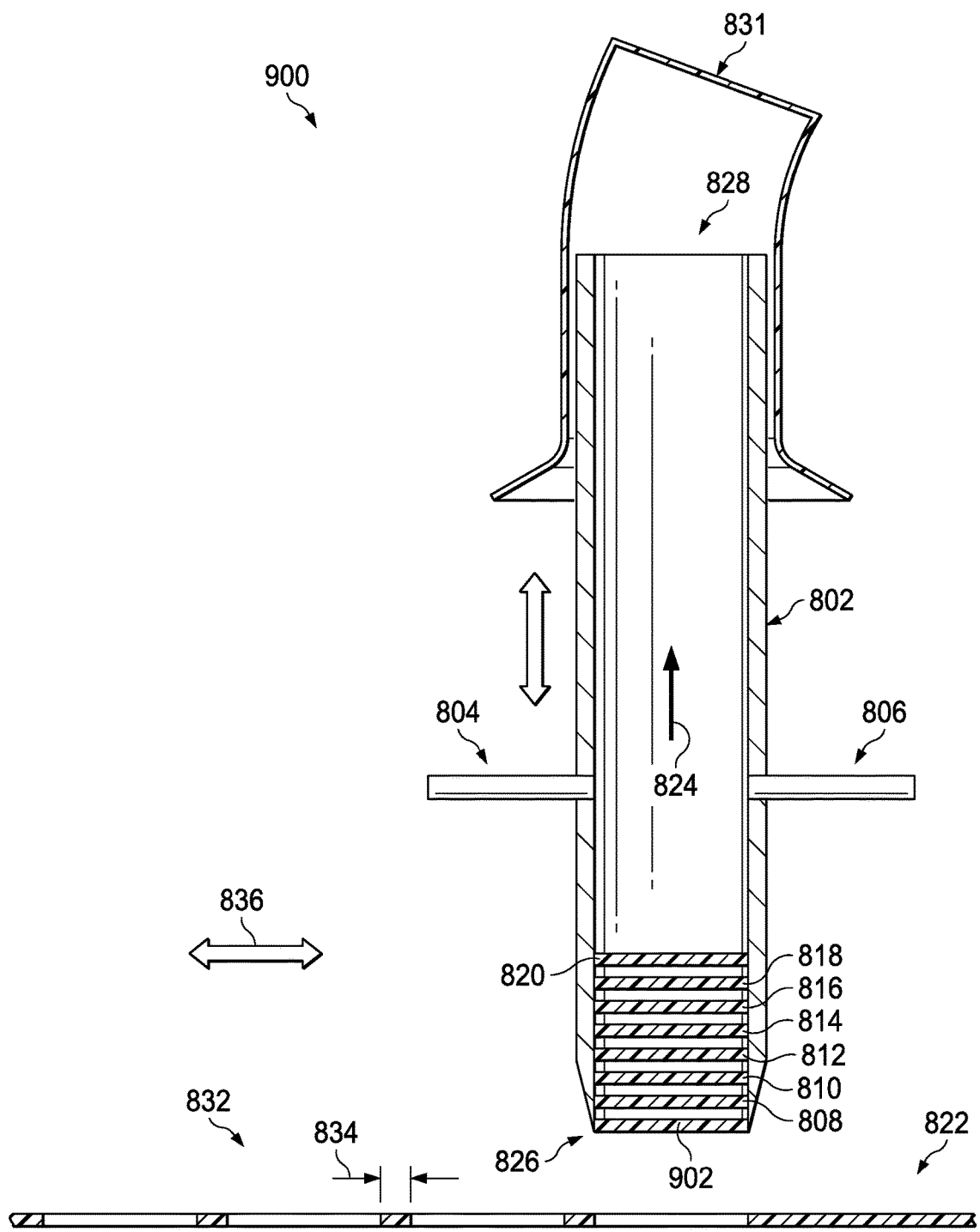
FIG. 9 is an illustration of a cross-sectional view of composite filler forming equipment in accordance with an illustrative embodiment.

Turning now to FIG. 9, an illustration of a cross-sectional view of composite filler forming equipment is depicted in accordance with an illustrative embodiment. View 900 depicts hollow punch 802 after having moved in direction 836 and having cut a subsequent layer of material 822. Specifically, layer 902 is now within hollow punch 802. Each of layer 808, layer 810, layer 812, layer 814, layer 816, layer 818, and layer 820 of material 822 have traveled in direction 824 within hollow punch 802 due to layer 902 entering hollow punch 802.

Figure 10:
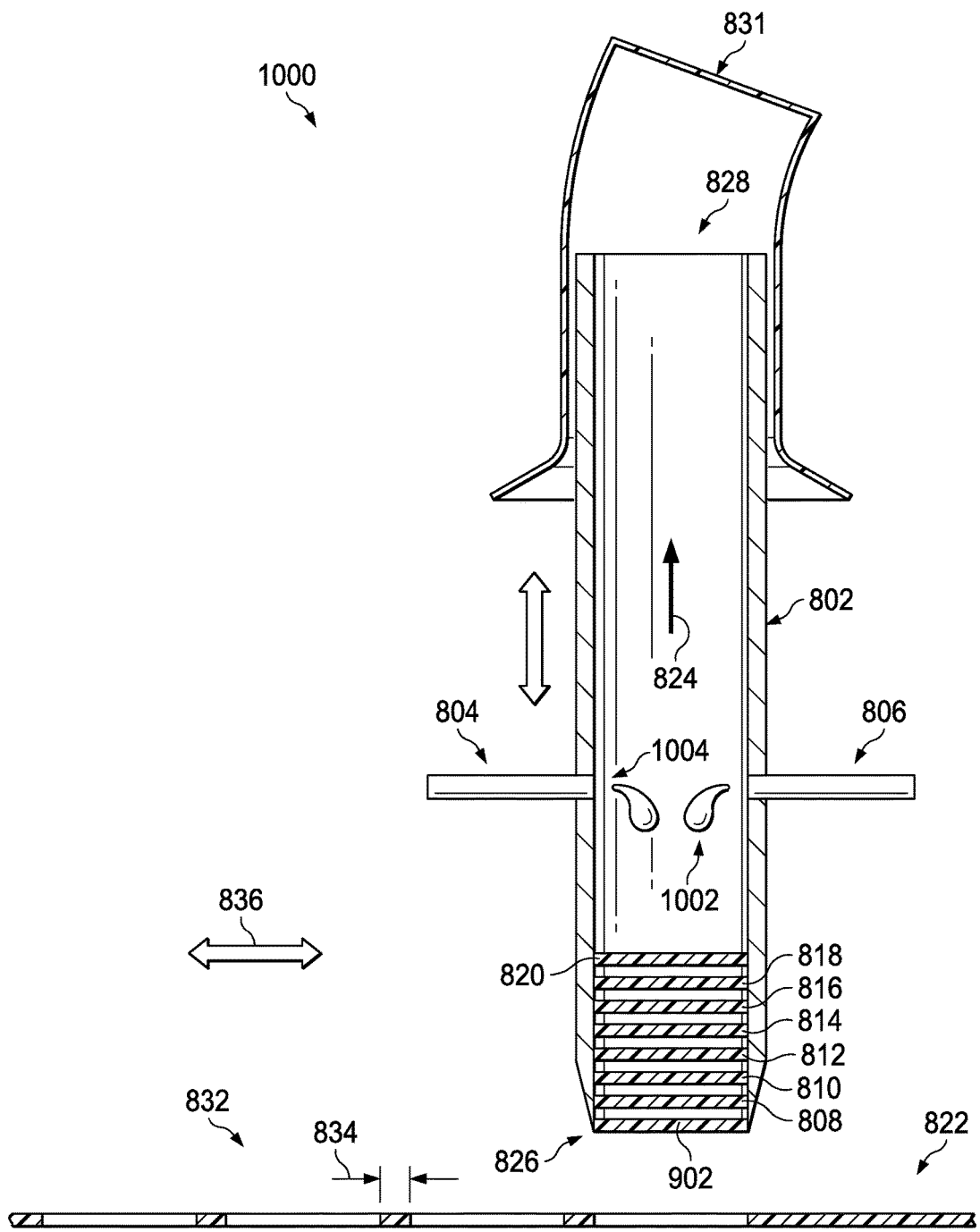
FIG. 10 is an illustration of a cross-sectional view of composite filler forming equipment in accordance with an illustrative embodiment.

Turning now to FIG. 10, an illustration of a cross-sectional view of composite filler forming equipment is depicted in accordance with an illustrative embodiment. View 1000 depicts hollow punch 802 during resin infusion of layer 808, layer 810, layer 812, layer 814, layer 816, layer 818, layer 820, and layer 902 of material 822. Specifically, in view 1000, resin 1002 has entered hollow punch 802 through resin injector 804 and resin injector 806. Resin 1002 could be selected such that resin 1002 is compatible with fibers of material 822. In some illustrative examples, resin 1002 may wet fibers of material 822 as each subsequent layer passes resin injector 804 and resin injector 806. In some illustrative examples, resin 1002 may wet fibers of material 822 of any layer present within hollow punch 802 when resin is introduced by resin injector 804 and resin injector 806. In some illustrative examples, resin 1002 may wet fibers of material 822 of a number of layers present within hollow punch 802 and near resin injector 804 and resin injector 806 when resin 1002 is introduced by resin injector 804 and resin injector 806. In some illustrative examples, this resin infusion may be done under vacuum.

Vertical position 1004 of resin injector 804 and resin injector 806 may be placed in any desirable location on hollow punch 802. Vertical position 1004 may be selected such that resin does not flow out of end 828 or leak from sharp edge 826.

Figure 11:
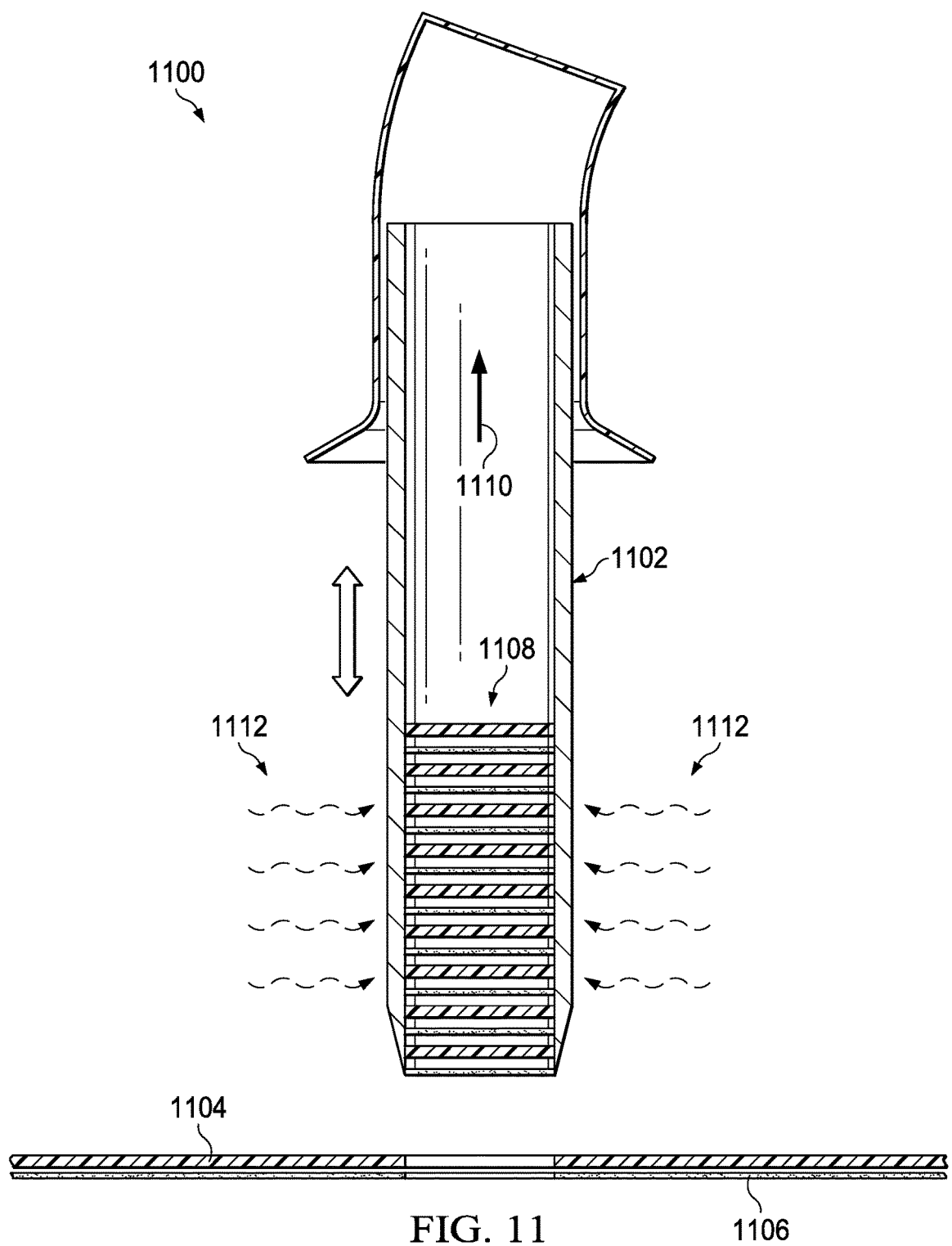
FIG. 11 is an illustration of a cross-sectional view of composite filler forming equipment in accordance with an illustrative embodiment.

Turning now to FIG. 11, an illustration of a cross-sectional view of composite filler forming equipment is depicted in accordance with an illustrative embodiment. In view 1100, hollow punch 1102 cuts layers from material 1104 backed with adhesive 1106. As number of layers 1108 travel in direction 1110 within hollow punch 1102, heat 1112 may be applied to hollow punch 1102. Heat 1112 may bond number of layers 1108 together. As depicted, layers 1108 are alternating layers of material 1104 which may be a dry fiber broad good and adhesive 1106. In some examples, adhesive 1106 may be a resin film. In these examples, heat 1112 may infuse the resin of adhesive 1106 into the fibers of material 1104 and may result in partially cured filler. This partial cure or bonding may provide greater handleability of a resulting composite filler.

The illustration of view 1100 in FIG. 11 is not meant to imply physical or architectural limitations to the manner in which an illustrative embodiment may be implemented. For example, layers 1108 may not be alternating layers. In some illustrative examples, a plurality of layers of material 1104 may be present between layers of adhesive 1106. In other illustrative examples, a plurality of layers of adhesive 1106 may be present between layers of material 1104.

Figure 12:
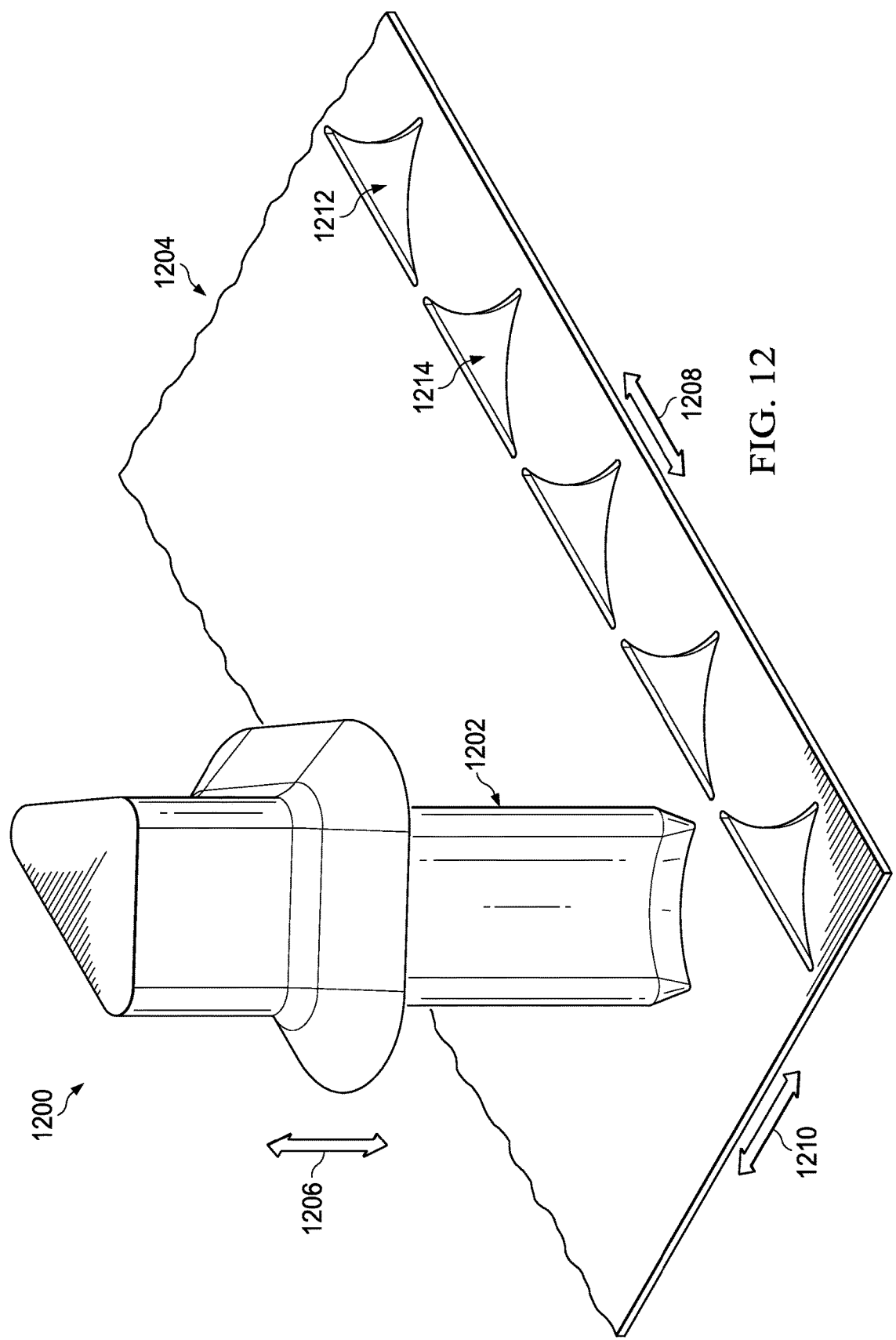
FIG. 12 is an illustration of an isometric view of composite filler forming equipment in accordance with an illustrative embodiment.

Turning now to FIG. 12, an illustration of an isometric view of composite filler forming equipment is depicted in accordance with an illustrative embodiment. Manufacturing environment 1200 may be a physical embodiment of manufacturing environment 1500. Manufacturing environment 1200 includes hollow punch 1202 and material 1204. Hollow punch 1202 may be used to cut layers out of material 1204 that may be aligned to form composite filler 306 of FIG. 3.

Hollow punch 1202 may be moved in direction 1206 to contact material 1204. After cutting a layer from material 1204, hollow punch 1202 may be moved in at least one of direction 1208 and direction 1210. As depicted, hollow punch 1202 may have started by cutting a layer from composite material 1204 at location 1212. Afterwards, hollow punch 1202 may have moved along direction 1208 to location 1214. After cutting a layer from material 1204 at location 1214, hollow punch 1202 may have moved along direction 1208 again. This process may be repeated along material 1204 until either a desired number of layers have been cut or hollow punch 1202 hits the edge of material 1204. If hollow punch 1202 hits the edge of material 1204, hollow punch 1202 may be moved in direction 1208 until hollow punch 1202 is over a desired location to cut material 1204.

Figure 13:
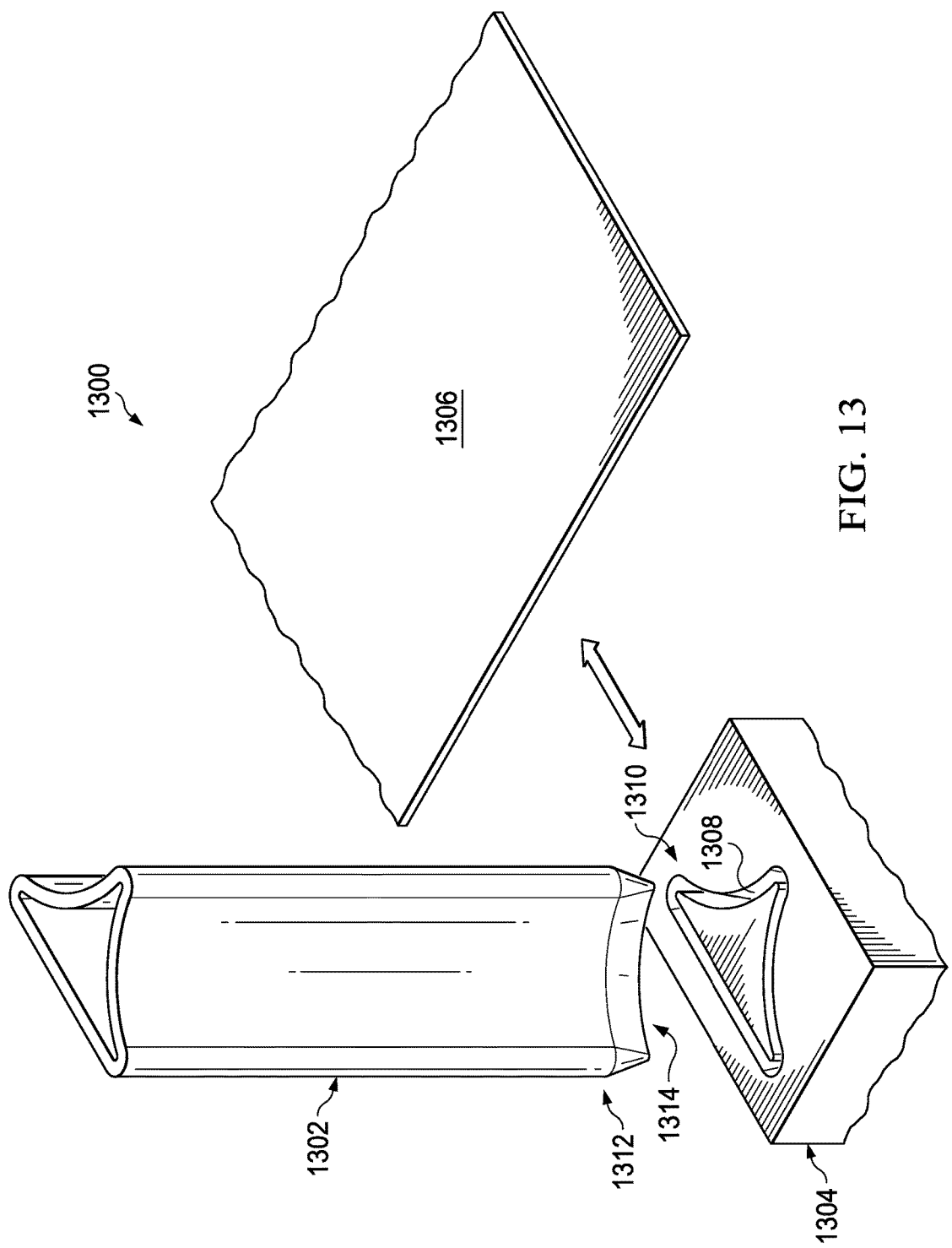
FIG. 13 is an illustration of an isometric view of another example of composite filler forming equipment in accordance with an illustrative embodiment.

Turning now to FIG. 13, an illustration of an isometric view of another example of composite filler forming equipment is depicted in accordance with an illustrative embodiment. Composite filler forming equipment 1300 may be a physical embodiment of composite filler forming equipment 1504 of FIG. 15. Composite filler forming equipment 1300 includes hollow punch 1302 and base 1304. Hollow punch 1302 and base 1304 may be used to cut out layers of material 1306. In this illustrative example, base 1304 may be rigid. Base 1304 includes recess 1308. Recess 1308 has cross-sectional shape 1310. Cross-sectional shape 1310 is substantially the same as cross-sectional shape 1312 of sharp edge 1314 of hollow punch 1302.

Figure 14:
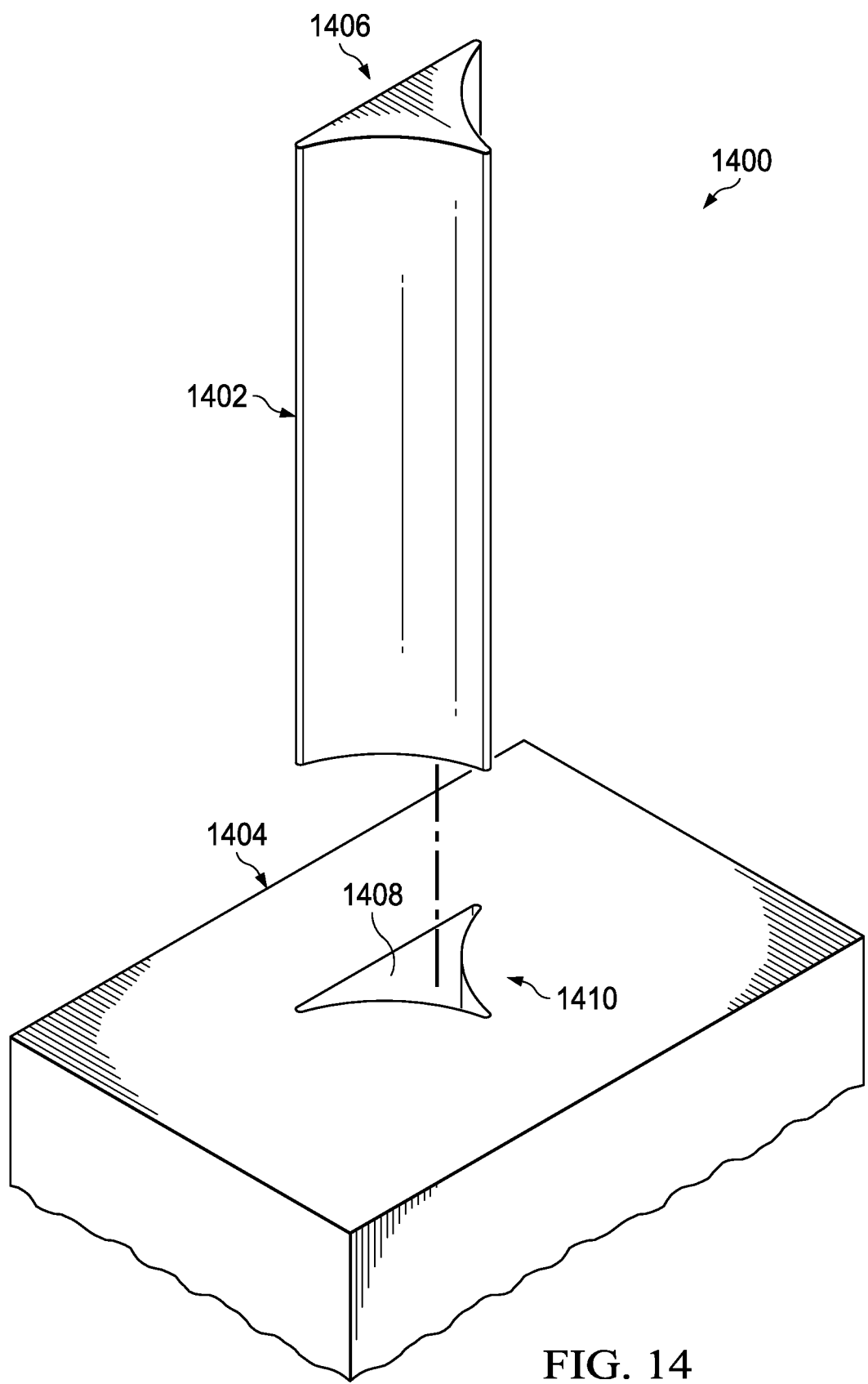
FIG. 14 is an illustration of an isometric view of yet another example of composite filler forming equipment in accordance with an illustrative embodiment.

Turning now to FIG. 14, an illustration of an isometric view of yet another example of composite filler forming equipment is depicted in accordance with an illustrative embodiment. Composite filler forming equipment 1400 may be a physical embodiment of composite filler forming equipment 1504 of FIG. 15. Composite filler forming equipment 1400 includes solid punch 1402 and plate 1404. Solid punch 1402 has cross-sectional shape 1406. Plate 1404 has hole 1408 with cross-sectional shape 1410. Cross-sectional shape 1406 is substantially the same as cross-sectional shape 1410 but smaller. In other words, cross-sectional shape 1410 may be a larger version of cross-sectional shape 1406. As a result, solid punch 1402 may enter hole 1408. The difference in size of cross-sectional shape 1406 and cross-sectional shape 1410 may be selected such that a material placed between solid punch 1402 and plate 1404 has a layer cut from it. The layer has substantially the same shape as cross-sectional shape 1410. Multiple layers of a material cut using solid punch 1402 and plate 1404 may be aligned to form a composite filler.

Figure 15:
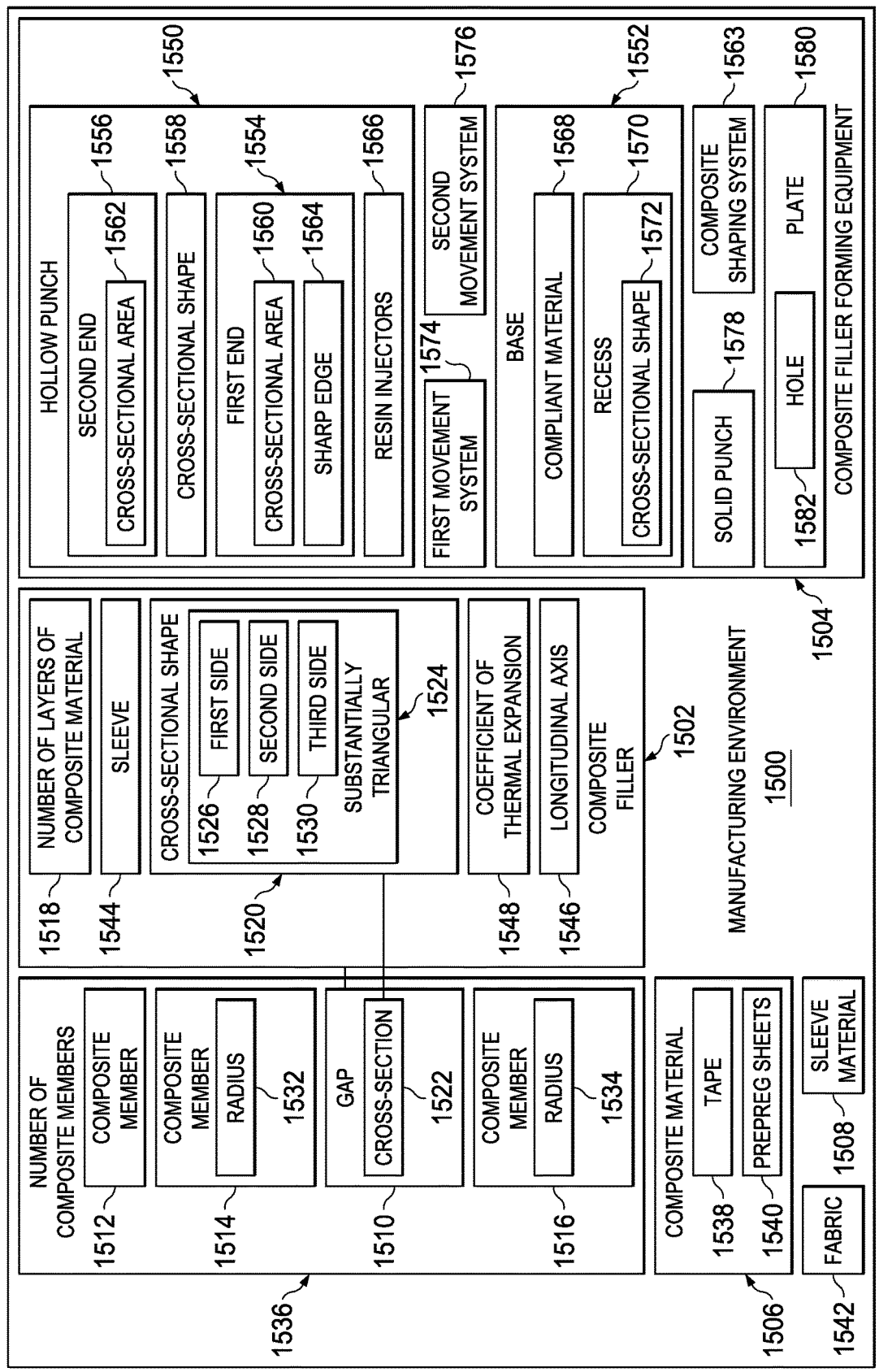
FIG. 15 is an illustration of a block diagram of a manufacturing environment in accordance with an illustrative embodiment.

Turning now to FIG. 15, an illustration of a block diagram of a manufacturing environment is depicted in accordance with an illustrative embodiment. Composite filler 306 of FIG. 3 may be formed using manufacturing environment 1500 of FIG. 15.

Manufacturing environment 1500 comprises composite filler 1502, composite filler forming equipment 1504, composite material 1506, and sleeve material 1508. Composite filler 1502 may be configured to be placed in gap 1510 formed by composite member 1512, composite member 1514, and composite member 1516.

Composite filler 1502 comprises number of layers of composite material 1518. Composite filler 1502 has cross-sectional shape 1520. Cross-sectional shape 1520 may be configured to fit within cross-section 1522 of gap 1510. In some illustrative examples, cross-sectional shape 1520 may be substantially triangular 1524. Substantially triangular 1524 cross-sectional shape 1520 has first side 1526, second side 1528, and third side 1530. First side 1526 of composite filler 1502 may contact composite member 1514. In some illustrative examples, composite member 1514 may have radius 1532. In these illustrative examples, first side 1526 of composite filler 1502 may follow radius 1532.

Second side 1528 of composite filler 1502 may contact composite member 1516. In some illustrative examples, composite member 1516 may have radius 1534. In these illustrative examples, second side 1528 of composite filler 1502 may follow radius 1534.

Third side 1530 may contact composite member 1512 of number of composite members 1536. Number of composite members 1536 includes composite member 1512, composite member 1514, and composite member 1516.

Number of layers of composite material 1518 may be formed from composite material 1506. Composite material 1506 may include tape 1538 and prepreg sheets 1540. Number of layers of composite material 1518 may be formed from fabric 1542 which is later infused with resin.

Number of layers of composite material 1518 may be cut from composite material 1506. Number of layers of composite material 1518 may be aligned to form composite filler 1502. Number of layers of composite material 1518 may be surrounded with sleeve material 1508 to form composite filler 1502 having sleeve 1544 around number of layers of composite material 1518.

Sleeve material 1508 may be a flexible woven material. Sleeve material 1508 may be selected based on compatibility with the resin of number of layers of composite material 1518. Sleeve material 1508 may further be selected based on at least one of weight, strength, or other material properties. For example, sleeve material 1508 may be selected such that sleeve material 1508 does not undesirably increase the weight of resulting composite filler 1502.

The weave of sleeve material 1508 may be substantially open. During cure of composite filler 1502, resin from number of layers of composite material 1518 may flow and fill the holes within the weave of sleeve material 1508. Sleeve material 1508 may also be referred to as a scrim. In some illustrative examples, sleeve material 1508 may take the form of a nylon or another polymeric material.

Number of layers of composite material 1518 has one or more ply orientations. Specifically, number of layers of composite material 1518 may have at least one of 0 degree plies, +/−10 degree plies, +/−15 degree plies, +/−30 degree plies, +/−45 degree plies, +/−60 degree plies, +/−75 degree plies, or +/−90 degree plies. In some illustrative examples, each layer of number of layers of composite material 1518 may have a single ply orientation. In some illustrative examples, each layer of number of layers of composite material 1518 may have a plurality of ply orientations. In some illustrative examples, a layer in number of layers of composite material 1518 may have a 0 degree/60 degree/−60 degree ply orientation.

Composite filler 1502 has longitudinal axis 1546. Number of layers of composite material 1518 and composite filler 1502 may each have cross-sectional shape 1520. Number of layers of composite material 1518 may be aligned such that their cross-sectional shapes are substantially orthogonal to longitudinal axis 1546.

The degree of expansion divided by the change in temperature for composite filler 1502 is coefficient of thermal expansion 1548. Composite filler 1502 is formed of composite material 1506 having oriented fibers. Accordingly, coefficient of thermal expansion 1548 may vary based on the direction of measurement. The fibers in number of layers of composite material 1518 that are in plane with cross-sectional shape 1520 extend orthogonal to longitudinal axis 1546. Composite filler 1502 may have coefficient of thermal expansion 1548 of substantially zero orthogonal to longitudinal axis 1546. Coefficient of thermal expansion 1548 may be zero orthogonal to longitudinal axis 1546 because of the fibers extending orthogonal to longitudinal axis 1546. Composite filler 1502 may have coefficient of thermal expansion 1548 of substantially zero orthogonal to each of the sides, first side 1526, second side 1528, and third side 1530, of cross-sectional shape 1520. In some illustrative examples, when cross-sectional shape 1520 is substantially triangular 1524, having zero degree plies, 60 degree plies, and −60 degree plies may cause coefficient of thermal expansion 1548 of substantially zero orthogonal to each of the three sides.

Composite filler forming equipment 1504 may cut number of layers of composite material 1518 from at least one of composite material 1506 or fabric 1542. In some illustrative examples, number of layers of composite material 1518 may be cut by hollow punch 1550 and base 1552. Hollow punch 1550 has first end 1554, second end 1556, and cross-sectional shape 1558. First end 1554 and second end 1556 have cross-sectional shape 1558. However, cross-sectional area 1560 of first end 1554 is smaller than cross-sectional area 1562 of second end 1556.

In some illustrative examples, cross-sectional shape 1558 may be the same or substantially the same as cross-sectional shape 1520. In other illustrative examples, layers of composite material 1506 or fabric 1542 cut using hollow punch 1550 having cross-sectional shape 1558 may be shaped using composite shaping system 1563. In these illustrative examples, the layers may be aligned and then shaped using composite shaping system 1563 such that the layers change from cross-sectional shape 1558 to cross-sectional shape 1520.

Sharp edge 1564 of first end 1554 may cut at least one of composite material 1506 or fabric 1542 to form layers. The layers may travel from first end 1554 to second end 1556 as additional layers are cut from at least one of composite material 1506 or fabric 1542. In illustrative examples in which hollow punch 1550 cuts layers from fabric 1542, these layers may be resin infused using resin injectors 1566 associated with hollow punch 1550.

Hollow punch 1550 may cut through at least one of composite material 1506 or fabric 1542 to contact base 1552. Base 1552 may be formed of compliant material 1568. By forming base 1552 of compliant material 1568, sharp edge 1564 may be maintained for more repetitions than if sharp edge 1564 contacted base 1552 formed of a rigid material. In some illustrative examples, base 1552 may have recess 1570. Recess 1570 may have cross-sectional shape 1572 which is substantially similar to cross-sectional shape 1558. As a result, base 1552 may be formed of a rigid material without undesirably dulling sharp edge 1564.

Hollow punch 1550 may move towards and away from base 1552 using first movement system 1574. In some illustrative examples, at least one of hollow punch 1550 or base 1552 may move relative to at least one of composite material 1506 or fabric 1542 using second movement system 1576. In some illustrative examples, at least one of hollow punch 1550 or base 1552 may move relative to the other using second movement system 1576.

In some illustrative examples, rather than hollow punch 1550 and base 1552, composite filler forming equipment 1504 may include solid punch 1578 and plate 1580. Plate 1580 may have hole 1582. Solid punch 1578 may interact with hole 1582 such that a layer of material is cut from at least one of composite material 1506 or fabric 1542 and sent through hole 1582. In some illustrative examples, number of layers of composite material 1518 exit hole 1582. Sleeve material 1508 may surround number of layers of composite material 1518.

The illustration of manufacturing environment 1500 in FIG. 15 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, manufacturing environment 1500 may not include composite member 1514. In this example, composite member 1512 and composite member 1516 may form gap 1510. In other illustrative examples, composite material 1506 may be cut by a different tool. For example, composite filler forming equipment 1504 may take the form of a laser, a knife, or other desirable cutting equipment. In these illustrative examples, each layer may be removed from composite material 1506 after being cut and then may be aligned.

Yet further, in some illustrative examples, composite material 1506 may be associated with an adhesive. In these illustrative examples, a heater may be associated with hollow punch 1550 to heat the adhesive as layers travel through hollow punch 1550. In these illustrative examples, by heating the adhesive and composite material 1506, the layers may be 'B-staged.' Further, by heating the layers of adhesive and composite material 1506, the layers may have greater handleability.

Figure 16:
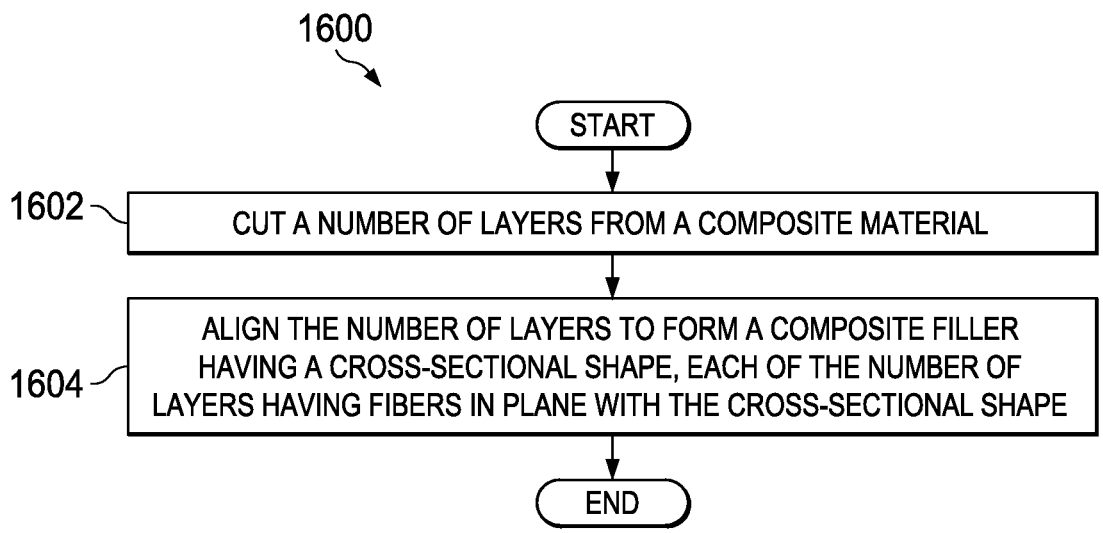
FIG. 16 is an illustration of a flowchart of a process for forming a composite filler in accordance with an illustrative embodiment.

Turning now to FIG. 16, an illustration of a flowchart of a process for forming a composite filler is depicted in accordance with an illustrative embodiment. Process 1600 may be used to form composite filler 306 of FIG. 3. Process 1600 may be used to form composite filler 1502 of FIG. 15.

Process 1600 begin by cutting a number of layers from a composite material (operation 1602). The number of layers may be cut from the composite material by composite filler forming equipment such as composite filler forming equipment 1504 of FIG. 15. In some illustrative examples, this composite filler forming equipment may be a hollow punch and a base. In other illustrative examples, the composite filler forming equipment may be a solid punch and a plate with a hole.

Process 1600 may then align the number of layers to form a composite filler having a cross-sectional shape, each of the number of layers having fibers in plane with the cross-sectional shape (operation 1604), with the process terminating thereafter. In some illustrative examples, the composite filler and each of the number of layers has the same cross-sectional shape. In some illustrative examples, the cross-sectional shape is substantially triangular.

In some illustrative examples, the composite filler has a longitudinal axis, and the fibers extend orthogonal to the longitudinal axis. In some illustrative examples, the composite filler has a coefficient of thermal expansion of substantially zero orthogonal to the longitudinal axis. The composite filler may have a coefficient of thermal expansion of substantially zero orthogonal to the longitudinal axis as the fibers extend orthogonal to the longitudinal axis.

In some illustrative examples, the composite filler has a coefficient of thermal expansion of substantially zero orthogonal to each of the sides of the cross-sectional shape. The coefficient of thermal expansion orthogonal to each of the sides of the cross-sectional shape may be influenced by the direction of fibers within the number of layers of composite material. In some illustrative examples, a number of fibers in the number of layers of composite material may be orthogonal to each of the sides of the cross-sectional shape.

In some illustrative examples, at least one layer of the number of layers of composite material may be a 0 degree/60 degree/−60 degree stack. In other illustrative examples, at least one layer of number of layers of composite material may have a 0 degree/45 degree/−45 degree stack.

Figure 17:
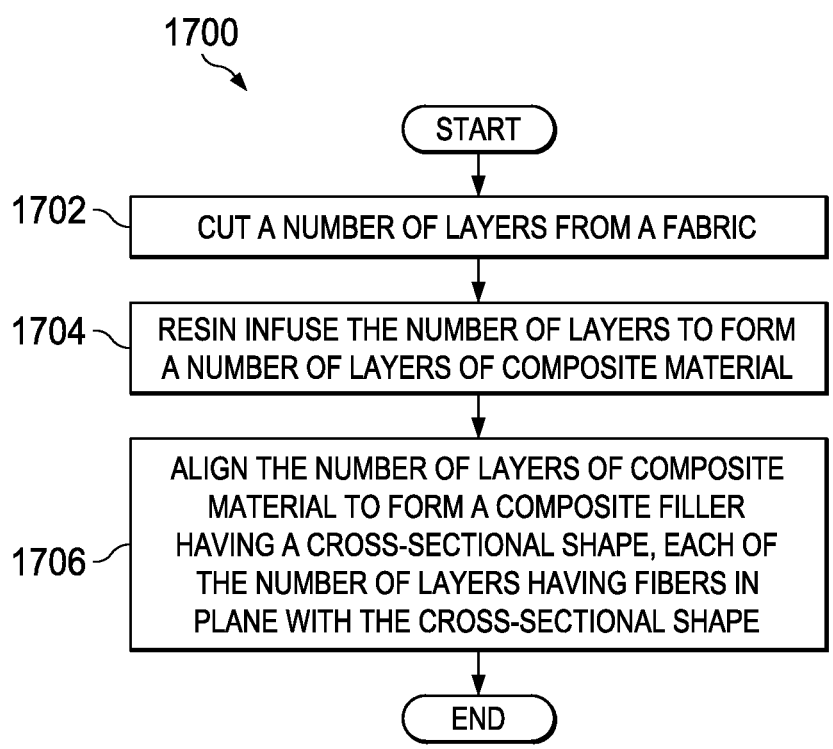
FIG. 17 is an illustration of a flowchart of a process for forming a composite filler in accordance with an illustrative embodiment.

Turning now to FIG. 17, an illustration of a flowchart of a process for forming a composite filler is depicted in accordance with an illustrative embodiment. Process 1700 may be used to form composite filler 306 of FIG. 3. Process 1700 may be used to form composite filler 1502 of FIG. 15.

Process 1700 begins by cutting a number of layers from a fabric (operation 1702). The number of layers may be cut from the fabric by composite filler forming equipment such as composite filler forming equipment 1504 of FIG. 15. In some illustrative examples, this composite filler forming equipment may be a hollow punch and a base. In other illustrative examples, the composite filler forming equipment may be a solid punch and a plate with a hole.

Process 1700 then resin infuses the number of layers to form a number of layers of composite material (operation 1704). Resin infusion may be performed through resin injectors associated with a hollow punch.

Process 1700 may then align the number of layers of composite material to form a composite filler having a cross-sectional shape, each of the number of layers having fibers in plane with the cross-sectional shape (operation 1706). In some illustrative examples, the composite filler has a longitudinal axis, and the fibers extend orthogonal to the longitudinal axis. In some illustrative examples, the composite filler has a coefficient of thermal expansion of substantially zero orthogonal to the longitudinal axis.

In some illustrative examples, the composite filler and each of the number of layers has the same cross-sectional shape. The cross-sectional shape may be substantially triangular. In some illustrative examples, the composite filler has a coefficient of thermal expansion of substantially zero orthogonal to each of the sides of the cross-sectional shape.

The coefficient of thermal expansion orthogonal to each of the sides of the cross-sectional shape may be influenced by the direction of fibers within the number of layers of composite material. In some illustrative examples, a number of fibers in the number of layers of composite material may be orthogonal to each of the sides of the cross-sectional shape. In some illustrative examples, at least one layer of number of layers of composite material may be a 0 degree/60 degree/−60 degree stack.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may not be implemented.

For example, at least one of process 1600 and process 1700 may further include surrounding the number of layers of composite material with a sleeve. This sleeve may take the form of a scrim. In some illustrative examples, at least one of process 1600 and process 1700 may further include placing the composite filler within a gap formed by a number of composite members and curing the composite filler.

Figure 18:
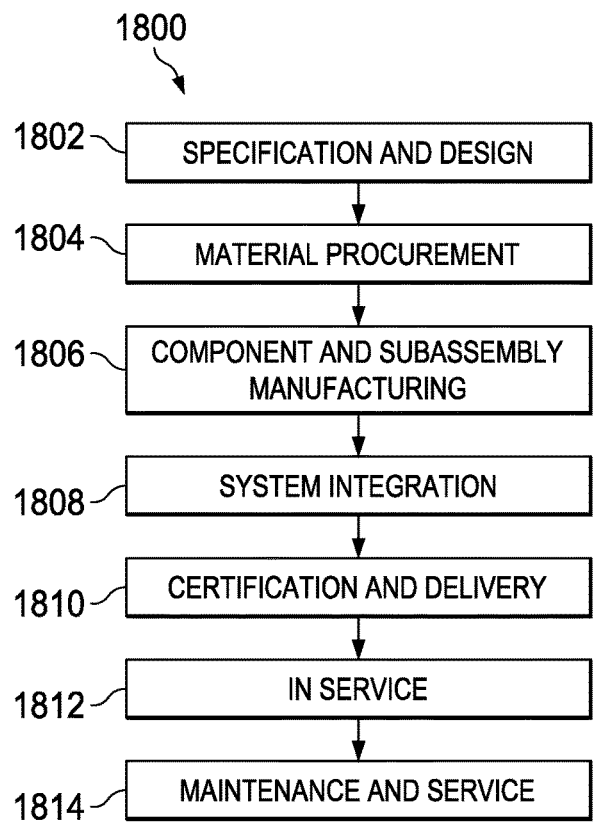
FIG. 18 is an illustration of a block diagram of an aircraft manufacturing and service method in accordance with an illustrative embodiment.
Figure 19:
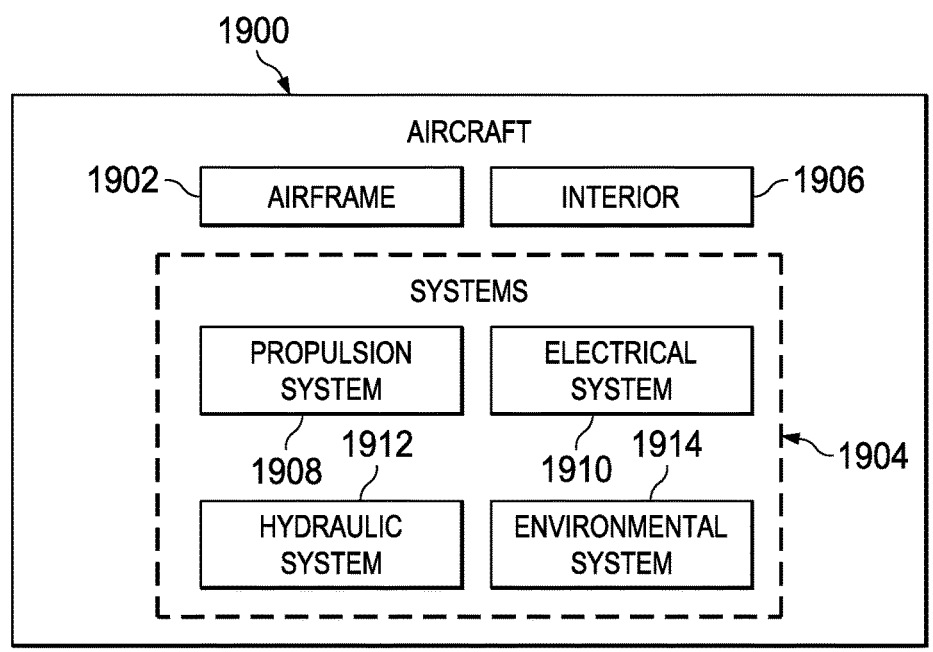
FIG. 19 is an illustration of a block diagram of an aircraft in which an illustrative embodiment may be implemented.

The illustrative embodiments of the disclosure may be described in the context of aircraft manufacturing and service method 1800 as shown in FIG. 18 and aircraft 1900 as shown in FIG. 19. Turning first to FIG. 18, an illustration of a block diagram of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of a block diagram of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1919. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. One or more illustrative embodiments may be used during component and subassembly manufacturing 1806. For example, composite filler 1502 in FIG. 15 may be used during component and subassembly manufacturing 1806. Further, composite filler 1502 may also be used to perform replacements during maintenance and service 1814.

Thus, the illustrative embodiments provide a method and apparatus for forming a composite filler. By forming a composite filler having a number of layers with fibers in plane with a cross-section of the composite filler, the composite filler may have a lower likelihood of cracking. Further, the composite filler may have a coefficient of thermal expansion of substantially zero orthogonal to the longitudinal axis. By having a coefficient of thermal expansion of substantially zero orthogonal to the longitudinal axis, the composite filler may have a lower likelihood of cracking. Further, the composite filler may have a coefficient of thermal expansion of substantially zero orthogonal to each of the sides of the cross-sectional shape of the composite filler. By having a coefficient of thermal expansion of substantially zero orthogonal to each of the sides of the cross-sectional shape, the composite filler may have a lower likelihood of cracking.

Yet further, by cutting a number of layers from a composite material to form a composite filler having fibers in plane with the cross-sectional shape of the composite filler, manufacturing time of the composite filler may be reduced. Additionally, by cutting a number of layers from a composite material to form a composite filler having fibers in plane with the cross-sectional shape of the composite filler, manufacturing costs of the composite filler may be reduced. Further, by using a sleeve, handling of composite filler may be improved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
cutting a number of layers from a composite material with a first end of a hollow punch;
cutting additional layers of the composite material such that the number of layers of composite material travels through the hollow punch from the first end to a second end of the hollow punch, wherein at least one of the number of layers is retained within the hollow punch as subsequent ones of the layers of composite material are cut with the hollow punch;
aligning the number of layers to form a composite filler having a cross-sectional shape, each of the number of layers having fibers in plane with the cross-sectional shape; and
removing the composite filler at the second end of the hollow punch as the additional layers of composite material cause the number of layers of composite material travels through the hollow punch.

2. The method of claim 1, wherein the composite filler has a longitudinal axis, and wherein the fibers extend orthogonal to the longitudinal axis.

3. The method of claim 2, wherein the composite filler has a coefficient of thermal expansion of substantially zero orthogonal to the longitudinal axis.

4. The method of claim 1 further comprising:
surrounding the number of layers of the composite material with a sleeve material.

5. The method of claim 1, wherein the cross-sectional shape is substantially triangular.

6. The method of claim 1 further comprising:
placing the composite filler within a gap formed at a bond line between a number of composite members; and
curing the composite filler.

7. The method of claim 6, wherein the step of curing the composite filler further comprises:
co-curing the composite filler with the number of composite members.

8. The method of claim 1, wherein the composite filler has a coefficient of thermal expansion of substantially zero orthogonal to each of sides of the cross-sectional shape.

9. The method of claim 1, further comprising:
receiving the number of layers of the composite material within a sleeve material as the number of layers of composite material exits the second end of the hollow punch.

10. The method of claim 9, wherein the sleeve comprises a scrim.

11. A method comprising:
cutting a number of layers from a fabric with a first end of a hollow punch;
cutting additional layers of the fabric such that the number of layers travels through the hollow punch from the first end to a second end of the hollow punch, wherein at least one of the number of layers is retained within the hollow punch as subsequent ones of the number of layers of fabric are cut with the hollow punch;
resin infusing the number of layers to form a number of layers of composite material;
aligning the number of layers of the composite material to form a composite filler having a cross-sectional shape, each of the number of layers having fibers in plane with the cross-sectional shape; and
removing the composite filler at the second end of the hollow punch as the additional layers of composite material cause the number of layers of composite material travels through the hollow punch.

12. The method of claim 11, wherein the composite filler has a longitudinal axis, wherein the fibers extend orthogonal to the longitudinal axis, and wherein the composite filler has a coefficient of thermal expansion of substantially zero orthogonal to the longitudinal axis.

13. The method of claim 11 further comprising:
surrounding the number of layers of the composite material with a sleeve material.

14. The method of claim 11 further comprising:
placing the composite filler within a gap formed by a number of composite members; and
curing the composite filler.

15. The method of claim 11, wherein the composite filler has a coefficient of thermal expansion of substantially zero orthogonal to each of sides of the cross-sectional shape.

* * * * *